United States Patent
Nemeth et al.

(10) Patent No.: US 8,837,279 B2
(45) Date of Patent: Sep. 16, 2014

(54) TECHNIQUE FOR IMPROVING CONGESTION CONTROL

(75) Inventors: Gabor Nemeth, Budapest (HU); Ferenc Kubinszky, Szentendre (HU); Andras Veres, Budapest (HU); Gergely Biczok, Evanston, IL (US); Peter Tarjan, Budapest (HU)

(73) Assignee: Optis Wireless Technology, LLC, Plano, TX (US)

( * ) Notice: Subject to any disclaimer, the term of this patent is extended or adjusted under 35 U.S.C. 154(b) by 224 days.

(21) Appl. No.: 12/996,475

(22) PCT Filed: Jun. 6, 2008

(86) PCT No.: PCT/EP2008/004549
§ 371 (c)(1),
(2), (4) Date: Dec. 6, 2010

(87) PCT Pub. No.: WO2009/146726
PCT Pub. Date: Dec. 10, 2009

(65) Prior Publication Data
US 2011/0149730 A1    Jun. 23, 2011

(51) Int. Cl.
*G06F 11/00* (2006.01)
*H04L 1/00* (2006.01)
*H04L 12/26* (2006.01)
*H04L 12/801* (2013.01)
*H04L 12/841* (2013.01)
*H04L 12/825* (2013.01)

(52) U.S. Cl.
CPC ............... *H04L 47/10* (2013.01); *H04L 47/12* (2013.01); *H04L 43/045* (2013.01); *H04L 47/193* (2013.01); *H04L 47/14* (2013.01); *H04L 47/11* (2013.01); *H04L 47/283* (2013.01); *H04L 43/0864* (2013.01); *H04L 47/25* (2013.01); *H04L 47/263* (2013.01)
USPC .......................... 370/229; 370/230; 370/230.1

(58) Field of Classification Search
CPC ..... H04L 43/0864; H04L 47/10; H04L 47/11; H04L 47/283; H04L 47/14; H04L 47/193; H04L 47/28; H04L 47/263; H04L 47/12
USPC .............. 370/229, 230, 230.1, 231, 232, 233, 370/234, 235
See application file for complete search history.

(56) References Cited

U.S. PATENT DOCUMENTS 7,149,664 B1 *   12/2006   Firoiu et al. ...................... 703/2
2002/0150048 A1 *   10/2002   Ha et al. ........................ 370/231

(Continued)

OTHER PUBLICATIONS

International Search Report for PCT/EP2008/004549, mailed Mar. 26, 2009.

(Continued)

*Primary Examiner* — Chuong T Ho

(74) *Attorney, Agent, or Firm* — Vincent J. Allen; James H. Ortega; Carstens & Cahoon, LLP

(57) ABSTRACT

A technique for controlling data transmission over a connection employing congestion control is provided. The technique comprises two basic aspects: Detecting a decrease of Round Trip Time in respect of the connection, wherein the detection is facilitated by comparing a short-term Round Trip Time average with a long-term Round Trip Time average (302); and, in response to a result of the detection, adjusting the congestion control so as to increase the data transmission rate (304). Particularly, adjusting the congestion control includes enabling a data transmission rate that is (even) higher than what would have been allowed by any conventional, congestion control. In effect, the present technique may 'push' the conventional congestion control when it is not increasing the data transmission rate fast enough.

21 Claims, 3 Drawing Sheets

(56) References Cited

U.S. PATENT DOCUMENTS

| | | |
|---|---|---|
| 2004/0064577 A1 | 4/2004 | Dahlin et al. |
| 2004/0114576 A1 | 6/2004 | Itoh et al. |
| 2004/0215753 A1 | 10/2004 | Chan et al. |
| 2006/0029037 A1 | 2/2006 | Chen et al. |
| 2006/0104313 A1* | 5/2006 | Haner et al. .......... 370/517 |
| 2008/0165723 A1* | 7/2008 | Kim .......... 370/318 |

OTHER PUBLICATIONS

Written Opinion for PCT/EP2008/004549, mailed Mar. 26, 2009.
International Preliminary Report on Patentability for PCT/EP2008/004549, mailed Apr. 29, 2010.
Cohen et al., "TCP for high Performance in Hybrid Fiber Coaxial Broad-Band Access Networks," IEEE/ACM Transaction on Networking, vol. 6, No. 1, Feb. 1998.

* cited by examiner

TECHNIQUE FOR IMPROVING CONGESTION CONTROL

This application is the U.S. national phase of International Application No. PCT/EP2008/004549 filed 6 Jun. 2008 which designated the U.S., the entire contents of which is hereby incorporated by reference.

TECHNICAL FIELD

The invention relates to communications systems in general and in particular to a technique for improving the conventional congestion control used in communications networks.

BACKGROUND

Congestion control is a well-known mechanism for controlling data entry into a communications network with communications links, or connections, between senders and receivers. Congestion control attempts to, among other things, avoid over-subscription of the link capacity so as to maintain the network performance at a satisfactory level. One of the typical measures used in congestion control is to regulate, or adjust, the rate of the data transmitted into the network by the individual senders. Usually, the regulation, or adjustment, takes into consideration certain feedback received from the receivers and/or any intermediate nodes along the connections.

Congestion control can be applied to all kinds of communications networks and implemented in many protocol stacks. For example, the Transmission Control Protocol, abbreviated as TCP, employs congestion control as one of its main aspects. TCP is an end-to-end protocol used for almost all data transmission over the Internet, such as HTTP, e-mail, file transfer and file download. TCP consists of a number of sub-systems of which congestion control is responsible for (fairly) utilising available bandwidth along the end-to-end connection.

There are many variants of congestion control, but most of them are based on the measurement of the transmission delay occurred on the connection between the two end-hosts. Such transmission delay is usually termed as Round Trip Time, abbreviated as RTT. Most congestion control variants use RTT measurements to detect how congested the network is.

Typically, an average of a certain number of instantaneous RTT measurements is calculated and maintained by the congestion control mechanism. Decisions as to data rate adjustments (e.g. whether to send more/less/no data into the network) are then based on this average and its derived statistical quantities.

As shown in FIG. 1, a typical TCP congestion control scenario, referred to as 100, attempts to predict or estimate future RTT's by sampling the behavior of data units, packets for example, sent over a connection and averaging the samples into a so-called "smoothed" Round Trip Time estimate, denoted as SRTT. The congestion control starts at step 102: When a plurality of packets is sent over a TCP connection, the receiver acknowledges the received packets by returning respective ACK messages. Then, at step 104, the sender measures the time it takes for the packets to be acknowledged by the receiver, producing a sequence of respective RTT samples: MRTT (1), MRTT (2), MRTT (3), and so on. Thereafter, as step 106 indicates, with each new sample MRTT (i), SRTT is updated according to the following:

$$SRTT(i+1) = \alpha \times SRTT(i) + (1-\alpha) \times MRTT(i), \quad (1)$$

where $\alpha$ is an adjustable constant between 0 and 1 that controls how rapidly SRTT adapts to changes. $\alpha$ can be expressed by $$\alpha = (A-1)/A, \quad (2)$$

where A is an arbitrarily chosen integer also termed "smoothing factor". The larger the smoothing factor is, the more MRTT samples are needed in order to calculate the very first SRTT value, and naturally, the longer it takes to accumulate these MRTT samples. After the first SRTT value is obtained, SRTT is updated each time a new MRTT sample arrives. In many conventional implementations, A is set to 8.

Next, at step 108, from SRTT (i), a retransmission timeout, RTO, which indicates the amount of time the sender needs to wait for a given packet to be acknowledged, can be computed as follows:

$$RTO(i) = \beta \times SRTT(i) \quad (3)$$

where $\beta$ is another adjustable constant greater than 1. Typically, $\beta$ is chosen such that there is a small probability that the Round Trip Time for the packet to be acknowledged (ACKed) should exceed RTO (i).

Finally, as step 110 shows, TCP congestion control uses certain algorithms to control the amount of outstanding data being injected into the network. Two common algorithms are "Slow Start" and "Congestion Avoidance". To implement these algorithms, a TCP state variable, "Congestion Window" (cwnd), is added to the TCP per-connection state. The cwnd is a sender-side limit on the amount of data the sender can transmit into the network before receiving an acknowledgment (ACK). Another state variable, the "Slow Start Threshold" (ssthresh), is used to determine whether the slow start or congestion avoidance algorithm is used to control data transmission, as discussed below. Further, a "Sender Maximum Segment Size" (SMSS) is defined to indicate the size of the largest packet that the sender can transmit.

Beginning transmission into a network with unknown conditions requires TCP to slowly probe the network to determine the available capacity, in order to avoid congesting the network with an inappropriately large burst of data. The slow start algorithm is used for this purpose at the beginning of a transfer, or after repairing loss detected by the retransmission timer.

During slow start, a TCP increments cwnd by at most SMSS bytes for each ACK received that acknowledges new data. Slow start ends when cwnd reaches or exceeds ssthresh or when congestion is observed. During congestion avoidance, cwnd is incremented by 1 full-sized segment per round-trip time (RTT). Congestion avoidance continues until congestion is detected.

Under normal conditions, an increase of the link capacity, e.g. bandwidth, causes the RTT to decrease. Particularly, sudden capacity increase on a bottleneck connection causes the RTT to swiftly decrease, as the bottleneck buffer empties. Thus, a decrease of RTT indicates an increased capacity that can be exploited. Inversely, an increase of RTT indicates a decrease of the connection capacity. However, none of the current congestion control mechanisms realises the usefulness of such indication and therefore has not implemented any measures to take advantage of it.

FIG. 2 shows how current TCP variants reach full connection utilisation after a large scale capacity increase. It can be seen that the adaptation from 10 Mbps to 100 Mbps—depending on network settings—takes between 10 to 50 seconds for high-speed TCP variants and more than 200 seconds for TCP NewReno. Further, it can be anticipated that, in certain communications technologies upcoming in the near future, e.g. in Long Term Evolution (LTE) systems, where the connection capacity is significantly larger than that of the current communications systems, the problem presented above will become even more relevant.

SUMMARY

Accordingly, there is a need to improve conventional congestion control mechanisms so as to (more) quickly adapt to capacity changes in the network.

According to one aspect, a method for controlling the transmission of data over a connection which employs a congestion control mechanism is provided. The method comprises detecting a decrease of Round Trip Time in respect of the connection, wherein this detection is facilitated by comparing a short-term Round Trip Time average with a long-term Round Trip Time average; and in response to a result of the detection, adjusting the congestion control so as to increase the data transmission rate.

In one variant, the short-term RTT average and the long-term RTT average are both smoothed RTT averages and may be obtained according to equation (1) above; the main difference there-between may be the smoothing factor: the long-term RTT average may have a larger smoothing factor. In effect, the short-term RTT average adapts to changes occurred to the connection more rapidly as does the long-term RTT average.

The result of the above detection could be, for example, that a Round-Trip-Time decrease to a certain extent is (positively) detected.

In one implementation, the congestion control is adjusted not only one time after the (positive) detection of the RTT decrease, but continuously or a plurality of times (e.g., over a time period) so that the data transmission rate is gradually increased.

According to conventional congestion control, which does not involve any comparison between a short-term Round Trip Time average and a long-term Round-Trip Time average, the data transmission rate may (still) be increased under certain circumstances. However, using the technique presented herein, the congestion control can be adjusted to enable an even higher data transmission rate, i.e. to achieve a more aggressive adjustment. Thus, adjusting the congestion control may include enabling a data transmission rate that is even higher than what would have been allowed, e.g. increased, by conventional congestion control with usual aggressiveness. Usual aggressiveness means, among other things, a level of adjustment, either increase or decrease, when a comparison between the short-term Round Trip Time average and the long-term Round Trip Time average has not taken place. In short, the present technique may thus "push" the conventional congestion control when it is not increasing the data transmission rate fast enough. In other words, the present technique may adjust the aggressiveness of the congestion control.

The data transmission rate is a parameter that indicates how fast the data from the sender can be transmitted, or "dumped", onto the connection. There exist numerous definitions of data transmission rate, one of which is a so-called "window" size. The "window" means a group of data units allowed to be transmitted per Round Trip Time, and the size of the window measures the amount of the data units in such a group. Thus, adjusting the congestion control may also include a procedure to increment the window size to increase the data transmission rate. Moreover, upon a positive detection of an RTT decrease (to a certain extent), the window size can be incremented by a larger degree than in the case that there has not been a comparison between the short-term RTT average and the long-term RTT average. Also, the window size can be adjusted not only one time after the (positive) detection of the RTT decrease, but a plurality of times, or over a time period, so that the data transmission rate is gradually increased.

Apart from calculating, recording, and updating the short-term RTT average and the long-term RTT average, a third parameter indicating a minimum of the RTT average may be recorded. Further, the recorded minimum RTT average may be updated with the value of the short-term RTT average, if the value of the short-term average is smaller than that of the recorded minimum RTT average.

In addition to adjusting the congestion control in the case of a decrease of the Round Trip Time, the method may further comprise a "reversed" procedure, that is, detecting an increase of the Round Trip Time in respect of the connection and, in response to a result of the detection of the increase, stopping adjusting the congestion control.

The detection of the RTT increase may be performed in many ways, for example by comparing the short-term Round Trip Time average with the recorded minimum Round Trip Time average. Further, the value of the long-term average may be updated, or replaced, with the value of the short-term average, if the value of the short-term average is greater than the value of the recorded minimum Round Trip Time average.

The present technique further comprises calculating the short-term Round Trip Time average and the long-term Round Trip Time average. As a choice, the calculation may follow equation (1) as given above, wherein the calculation of the long-term average employs a larger smoothing factor than that employed by the calculation of the short-term average. The smoothing factors can be arbitrarily chosen, provided that the smoothing factor used for calculating the long-term average is larger than that used for the short-term average calculation. In one implementation, a smoothing factor is a power of two, because this enables faster machine execution in the implementation using bit-shifting.

The connection over which data is transmitted may be wireless, wired, or a mixture of the two. For instance, the connection may include a segment across a wireless network, such as a radio link based on LTE technologies.

Changing network conditions can lead to a decrease and/or increase of the Round Trip Time. Apart from the known factors often associated with wired connections, characteristics of wireless communications or mobile communications may play a part as well. For instance, in a mobile communications scenario where a base station transmits data to a user terminal, RTT decrease/increase can be at least partially caused by one or more of the following: A handover of a user terminal from one base station to another, a movement of a user terminal within a cell of a base station, and a change in a user-terminal population of a cell of a base station.

According to a further aspect, a computer program product is provided. The computer program product comprises program code portions for performing the steps of the method described herein when the computer program product is executed on a computer system or a computing device. The computer program product may be stored on a computer readable recording medium.

The technique presented herein can generally be practiced by means of hardware, software or a combined hardware/software approach.

According to a hardware aspect, an apparatus is provided to control the transmission of data over a connection employing a congestion control mechanism. The apparatus comprises a detector that is adapted to detect a decrease of a Round Trip Time in respect of the connection, wherein the detection is facilitated by comparing a short-term Round Trip Time average with a long-term Round Trip Time average; and an adjustor adapted to, according to a result of the detection, adjust the congestion control to increase the data transmission rate.

The adjustor may further be configured to adjust the congestion control for a period of time so as to gradually increase the data transmission rate. Specifically, the congestion control can be adjusted not only one time after the (positive) detection of the RTT decrease, but continuously or a plurality of times (e.g., over a time period) so that the data transmission rate is gradually increased.

Apart from being able to detect the decrease of the Round Trip Time, the detector may further be adapted to detect an increase of the Round Trip Time in respect of the connection. Accordingly, the adjustor can also be adapted to stop adjusting the congestion control in response to a result of the detection of the increase. Moreover, the detector can carry out a comparison between the short-term Round Trip Time average with a minimum Round Trip Time average in order to detect the increase.

The apparatus can be configured to execute all the embodiments of the method implementations discussed herein. The apparatus may be integrated into a data sending device which has congestion control mechanism preferably built-in. As an example, the data sending device could be a server located on the Internet or Intranet. Particularly, the apparatus can be incorporated in the TCP protocol. The apparatus can also be embodied in a mobile terminal (such as a mobile telephone) or in a base station of a mobile communications network.

DESCRIPTION OF THE DRAWINGS

Below, the technique presented herein will be described with reference to exemplary embodiments illustrated in the drawings, wherein.

DESCRIPTION OF PREFERRED EMBODIMENTS

In the following description, for purposes of explanation and not limitation, specific details are set forth, such as particular sequences of steps, interfaces and configurations, in order to provide a thorough understanding of the technique presented herein. It will be apparent to one skilled in the art that the technique may be practised in other embodiments that depart from these specific details. For example, it will be apparent to the skilled artisan that the technique can also be practised in connection with other congestion control mechanisms as those explicitly described herein.

Moreover, those skilled in the art will appreciate that the functions explained herein below may be implemented using software functioning in conjunction with a programmed microprocessor or general purpose computer. It will also be appreciated that while the technique presented herein is primarily described in the form of methods and apparatuses, the technique may also be embodied in a computer program product as well as in a system comprising a computer processor and a memory coupled to the processor, wherein the memory is encoded with one or more programs that may perform the functions disclosed herein.

Hereinafter, reference is made to a commonly used TCP congestion control variant (called "base TCP" here-after), but it will be appreciated by the skilled person that the present technique can be well applied to any congestion control mechanisms implemented in any other protocol stacks.

Assume data units are being transmitted (from a sender to a receiver) over a connection that has a conventional congestion control already implemented. Then this conventional congestion control is modified in accordance with the apparatus and method embodiments described below.

Figure 3:
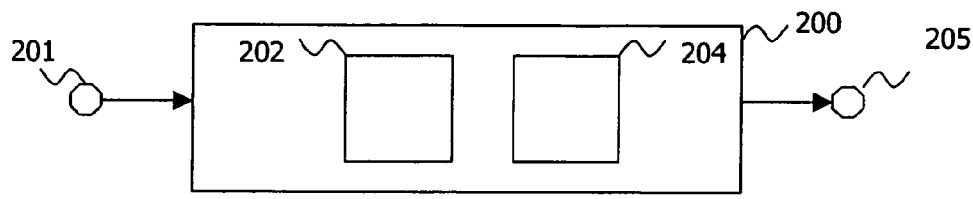
FIG. 3 is a block diagram illustrating an apparatus embodiment.

Referring to FIG. 3, an apparatus embodiment 200 comprises mainly two components, a detector 202 and an adjustor 204. Through an input 201, the detector 202 obtains certain variables and forms a decision as to whether or not to trigger the adjustor 204 into function. Upon a trigger-on condition, the adjustor 204 starts functioning and outputs, via output 205, instructions on how to adjust the data transmission rate.

Figure 4:
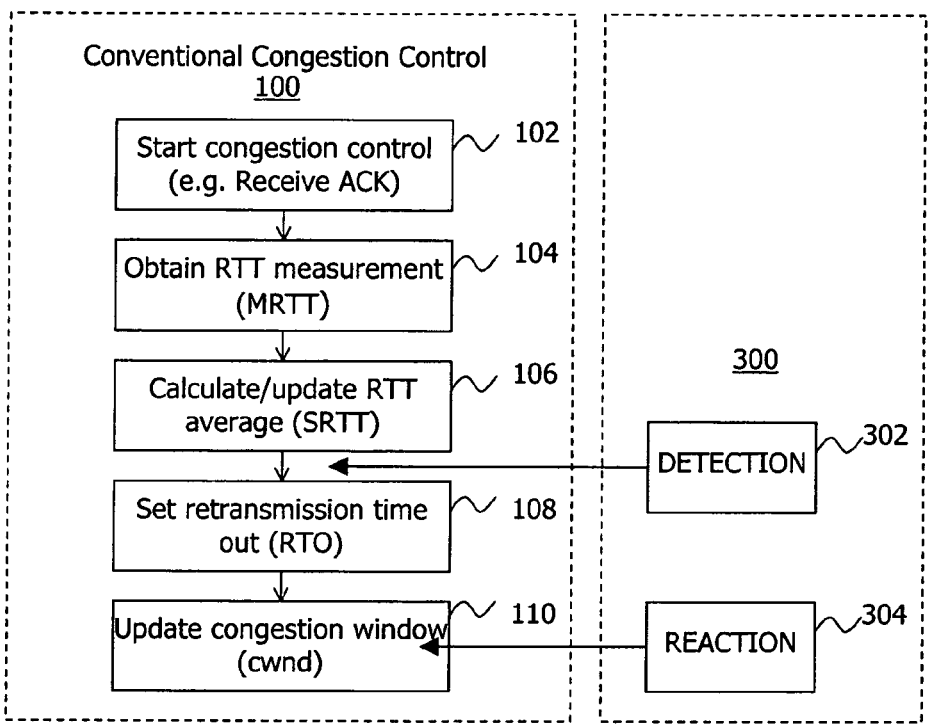
FIG. 4 is a block diagram illustrating a method embodiment.
Figure 5:
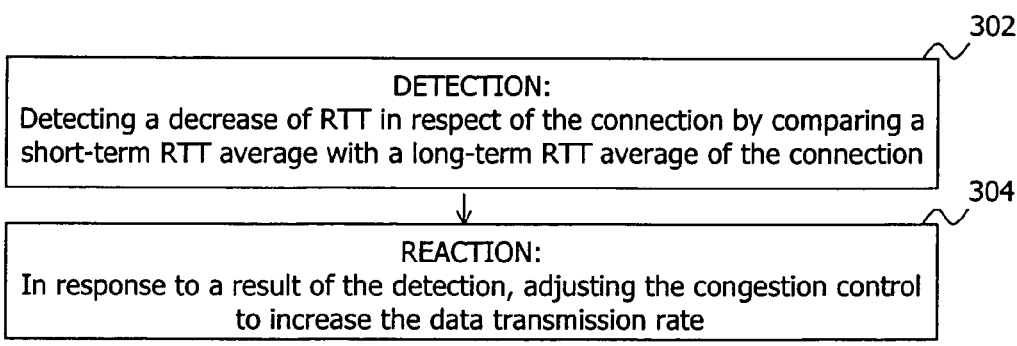
FIG. 5 is a block diagram further illustrating the method embodiment of FIG. 4.

The functions of components of the apparatus 200 will become clearer by analyzing the flowchart 300 of FIG. 4 illustrating a method embodiment that may be carried out by the apparatus 200. The detector 202 and adjustor 204 are adapted to perform two main phases of the method embodiment, namely a "DETECTION" phase 302 and a "REACTION" phase 304, both of which are coupled to the existing phases 102, 104, 106, 108, 110 of the conventional congestion control 100. FIG. 5 provides more details of the two phases.

Generally, the DETECTION phase 302 is aimed at identifying time-intervals when the short-term RTT average is (significantly) lower than the long-term average, and is appended to the end of the base TCP's RTT updating phase. The REACTION phase 304, on the other hand, is a conditional modification of the base TCP's congestion window updating process, and it is executed only if a certain trigger set during the DETECTION phase 304 is on.

In more detail, during the detection phase 302 a decrease of the RTT in respect of the connection is detected by comparing a short-term RTT average to a long-term RTT average; and, at the reaction phase 304, upon a (positive) result of the detection, the congestion control is adjusted to increase the data transmission rate. In particular, by executing this method, the aggressiveness of the congestion control may be adjusted— the congestion control may thus be "pushed" to allow a higher data transmission rate than where there has not been a comparison between the short-term and long-term RTT averages.

Both the "short-term RTT average" and the "long-term RTT average" are smoothed RTT averages that can be calculated according to equation (1) above. The main difference between the two averages is the "smoothing factor" employed. The smoothing factor for calculating the long-term average is larger than the one for the short-term average. In effect, the short-term RTT average adapts to changes occurred to the connection more rapidly than does the long-term RTT average.

In the following, exemplary examples of the DETECTION and REACTION phases are described in detail.

For the DETECTION phase carried out by the detector 202 in FIG. 3, three variables are maintained for a connection: trigger, longtermsmooth, and minsrtt. In some cases, it is preferable to maintain a per-flow data block containing such three variables. The DETECTION phase is executed every time the base TCP updates its RTT average, typically after every ACK reception. This average is the short-term average and denoted as srtt. The short-term average, "srtt", may be defined as follows:

$$srtt(i+1) = 7/8 \times srtt(i) + (1/8) \times mrtt(i) \tag{4}$$

During the DETECTION phase a long-term smoothed RTT average is also calculated and updated, using the measured RTT value for the given ACK, mrtt:

The long-term average can be calculated as follows:

$$longtermsmooth(i+1) = 1023/1024 \times longtermsmooth(i) + 1/1024 \times mrtt(i) \tag{5}$$

The smoothing factor for calculating longtermsmooth can arbitrarily chosen, provided it is larger than the smoothing factor used by base TCP in calculating srtt, which is typically 8. Preferably, the smoothing factors are a power of 2 for faster machine execution in the implementation using bit-shifting.

The values of srtt, longtermsmooth, and minsrtt can determine what value the trigger variable shall take. As its name indicates, the trigger variable facilitates an "on" and/or "off" of the adjustment of the data transmission rate. When the trigger is turned on, the adjusting keeps performing for a period of time so as to gradually increase the data transmission rate. When the trigger is off, the adjusting is stopped.

Particularly, srtt is compared to longtermsmooth, and the result of the comparison indicates how significantly the short-term average is lower than the long-term average. The trigger's turned on if the ratio of the two is lower than a threshold parameter p1.

Trigger-on condition: $srtt/longtermsmooth < p1$

Trigger-on threshold p1 is adjustable; an example value is 0.75.

Then, if trigger's on, the lowest, i.e. the minimum srtt since the time the trigger was turned on is recorded. Otherwise, if the actual srtt exceeds its recorded minimum by a threshold factor p2, the trigger's turned off.

Trigger-off condition: $srtt/minsrtt > p2$

Trigger-off threshold p2 is also adjustable; an example value is 1.125.

Between the time that the trigger is turned on and the moment it is turned off, the congestion control is adjusted for a plurality of times, or continuously adjusted. That is to say, after a RTT decrease to a certain degree is detected (corresponding to the Trigger-on condition), the congestion control is adjusted not only one time, but also a plurality of times, or for a time period. During each adjustment step, the congestion control is "pushed" to effect a data transmission rate higher than what would been allowed, e.g. increased, by the (conventional) congestion control with usual aggressiveness. Hence, the data transmission rate can be gradually increased. Moreover, due to the comparison between the short-term and long-term RTT averages, the data transmission rate can be increased more rapidly than the conventional congestion control.

When the trigger is turned off, the adjusting of the congestion control as described above is stopped. The usual congestion control resumes.

The DETECTION phase may be summarized by the following pseudo-code:

```
if srtt = 0
    longtermsmooth ← mrtt * 2^1024
else
    longtermsmooth ← 1023/1024 * longtermsmooth
                     + 1/1024 * mrtt
end if
if trigger is off and srtt / longtermsmooth < p1
    turn trigger on
    minsrtt ← srtt
endif
if trigger is on
    if srtt < minsrtt
        minsrtt ← srtt
    end if
    if srtt / minsrtt > p2
        turn trigger off
        longtermsmooth ← srtt
    end if
end if
```

Technically, when implementing the pseudo-code, the same variable may be used for both "longtermsmooth" and "minsrtt" for memory saving considerations, because only one of the two is meaningful at any given time: if trigger is off, longtermsmooth is updated (and there is no need for taking care of minsrtt); and if trigger is on, minsrtt is recorded/updated (no need to care for longtermsmooth).

Figure 1:
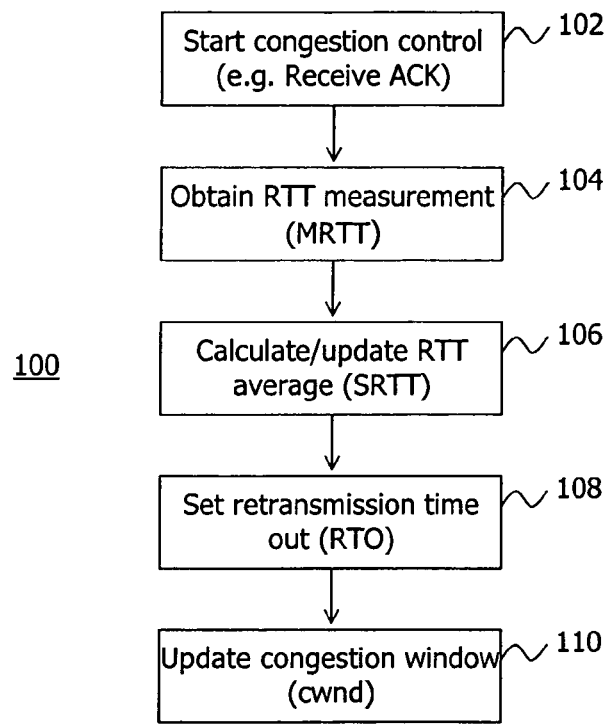
FIG. 1 is a block diagram illustrating the basic procedure of a conventional TCP congestion control.
Figure 2:
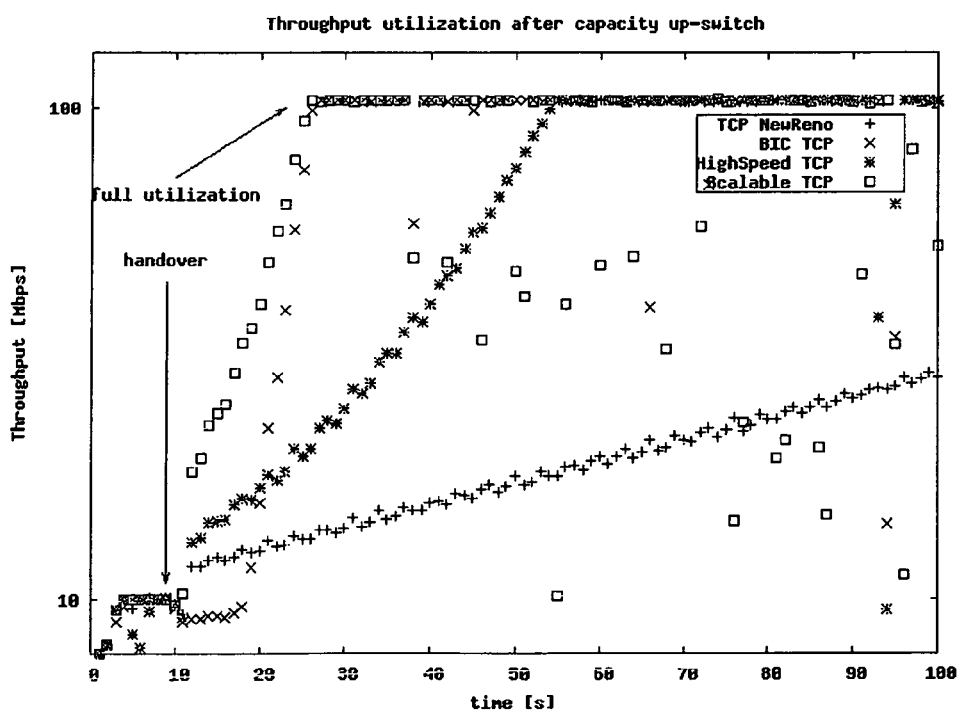
FIG. 2 shows how conventional TCP variants reach full link utilisation after a large scale capacity increase.

As shown in FIG. 4, the REACTION phase carried out by the adjustor 204 of FIG. 2 is conditionally executed each time the base TCP updates its congestion window cwnd. In the case of per-flow data block, the REACTION phase is conditionally executed each time the base TCP updates its per-flow congestion window for the given flow.

If the trigger is off at the time of the update, the base TCP's updating process is left as it is. If the trigger is on, the most aggressive window increment strategy of the base TCP is forcibly used instead of the usual process.

Preferably, the REACTION phase is tuned to a given base TCP congestion control, and two examples are given for demonstration.

TCP Reno and similar protocols include two phases for cwnd increment and use these phases depending on protocol state. In slow start phase, cwnd is incremented exponentially, and the present invention does not change that behavior. In congestion avoidance phase, cwnd increments by 1 every RTT in average. This latter is changed by appending the following process at the end of the base TCP's congestion avoidance phase:

```
if trigger is on and cwnd was increased by 1
    cwnd ← cwnd + MAX_INCREMENT - 1
end if
```

Here MAX_INCREMENT is an arbitrary constant, defining the maximum linear increment of cwnd. Example value for MAX_INCREMENT is 16.

In principle, instead of "1", the usual cwnd increment per RTT may by any value, n. Hence:

```
if trigger is on and cwnd was increased by n
    cwnd ← cwnd + MAX_INCREMENT - n
end if
```

BIC TCP and CUBIC TCP use a two-leveled method for cwnd increment: first, the regime of increase is selected from a set of 8 choices, then the cwnd is actually incremented or unchanged according to the selected regime. The present invention changes this process by forcibly selecting the most aggressive regime called max increment, if the trigger is on.

The above embodiments achieve a congestion control that can more quickly adapt to changes affecting the connection. They improve performance during changing network and/or terminal conditions.

Figure 6:
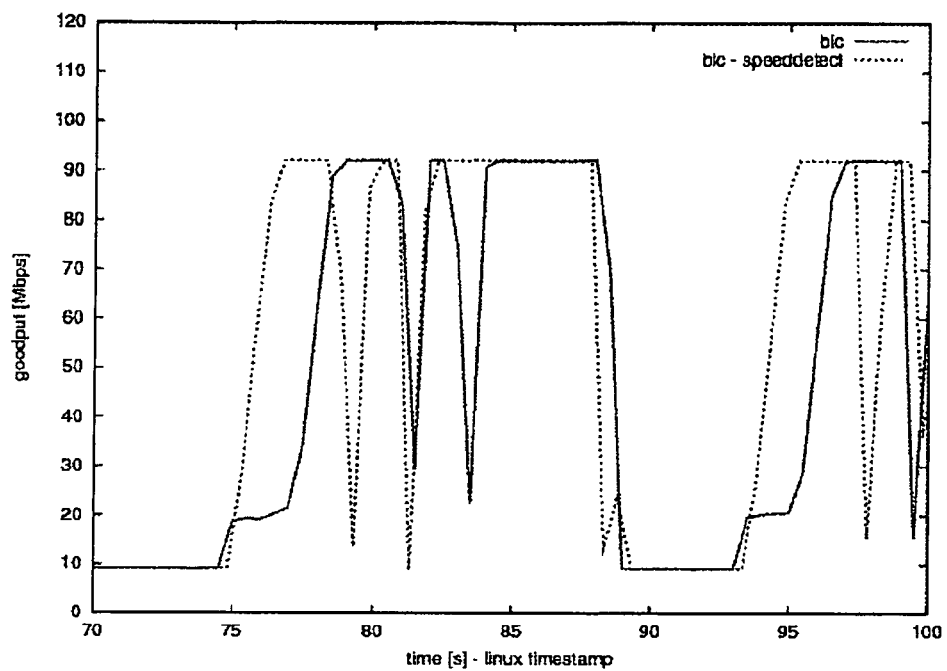
FIG. 6 is a diagram showing the performance improvement, from the perspective of the data sender, that can be achieved by the embodiments; particularly, the diagram shows an increased throughput of a certain variant of TCP with an embodiment of the adjusted congestion control mechanism.
Figure 7:
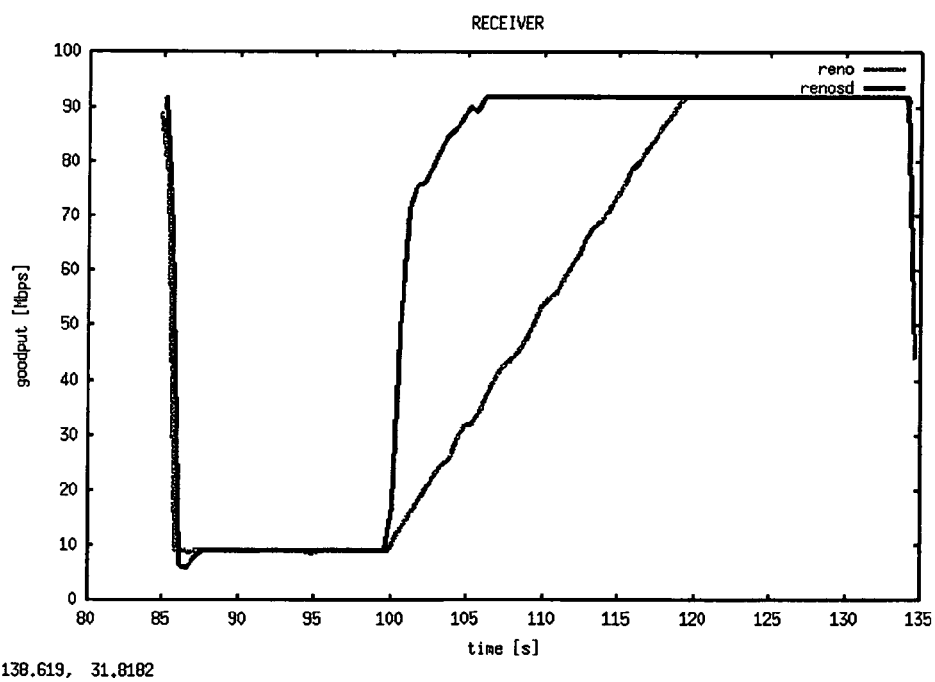
FIG. 7 is another diagram showing the performance improvement, but from the perspective of the data receiver.

Among other things, the technique discussed herein can rapidly increase data throughput after capacity increases (e.g., after handovers, moving in the cell, or cell population decreases). As an example. FIG. 6 shows the throughput of BIC TCP (labeled "bic") and that of BIC TCP implemented with the present embodiment ("bic-speeddetect") during capacity increase at 75 s and 93 s. It is clear that if capacity increases from 10 Mbps by more than 10 Mbps, the embodiments cause the protocol to utilize the increased capacity much faster. The effect is even more visible for TCP NewReno, as can be appreciated from FIG. 7.

In addition, the technique discussed herein is a new sender-side protocol that requires no changes to the receiver side. It can be easily incorporated into a server on the Internet.

Although particular embodiments have been illustrated in the accompanying drawings and described in the foregoing description, it should be understood by those skilled in the art that the invention is not limited to the embodiments disclosed herein. Moreover, numerous improvements, modifications, rearrangements, and substitutions can be implemented without departing from the scope of the invention as set forth and defined by the following claims.

The invention claimed is:

1. A method for controlling the transmission of data over a connection employing a congestion control mechanism, the method comprising: detecting a decrease of a Round Trip Time in respect of the connection by comparing a short-term Round Trip Time average with a long-term Round Trip Time average, wherein the short-term Round Trip Time average and the long-term Round Trip Time average are calculated independently of each other using different smoothing factors; and in response to a result of the detection, adjusting the congestion control to increase the data transmission rate, wherein the smoothing factor for calculating the long-term Round Trip average is larger than the one for the short-term Round Trip Time average.

2. The method of claim 1, wherein the congestion control is adjusted over a period of time to gradually increase the data transmission rate.

3. The method of claim 1, wherein adjusting the congestion control includes enabling a higher data transmission rate than what would have been allowed by the congestion control had it not been for the comparison between the short-term Round Trip Time average and the long-term Round Trip Time average.

4. The method of claim 1, wherein the data transmission rate is defined by a size of a window indicating the number of data units allowed to be transmitted per Round Trip Time.

5. The method of claim 4, wherein adjusting the congestion control comprises gradually incrementing the window size.

6. The method of claim 1, further comprising:
updating a recorded minimum Round Trip Time average with the short-term average, if the short-term average is smaller than the recorded minimum Round Trip Time average.

7. The method of claim 6, further comprising:
updating the value of the long-term average with the value of the short-term average, if the value of the short-term average is greater than the value of the recorded minimum Round Trip Time average.

8. The method of claim 1, further comprising:
detecting an increase of the Round Trip Time in respect of the connection; and
in response to a result of the detection, stopping adjusting the congestion control.

9. The method of claim 8, wherein detecting the increase comprises comparing the short-term Round Trip Time average with the recorded minimum Round Trip Time average.

10. The method of claim 8, wherein the decrease and/or increase of the Round Trip Time is at least partially caused by one or more of the following: a handover of a user terminal from a base station to another, a movement of a user terminal within a cell of a base station, and a change in a user-terminal population of a cell of a base station.

11. The method of claim 1, further comprising:
calculating the short-term average and the long-term average, wherein the long-term average is calculated by employing a larger smoothing factor than that employed by the calculation of the short-term average.

12. The method of claim 1, wherein the connection includes a segment across a wireless network.

13. The apparatus of claim 1, wherein the short-term Round Trip Time average adapts more rapidly to changes in the connection than the long-term Round Trip Time average.

14. The apparatus of claim 1, wherein the short-term Round Trip Time average and the long-term Round Trip Time average are smoothed averages, and wherein a smoothing factor associated with the long-term Round Trip Time average is larger than a smoothing factor associated with the short-term Round Trip Time average.

15. The apparatus of claim 1, wherein the short-term Round Trip Time average and the long-term Round Trip Time average are separately calculated from a sequence of round trip samples.

16. The apparatus of claim 1, wherein the adjusting the congestion control comprises:
turning on the congestion control when a ratio of short-term Round Trip Time average to the long-term Round Trip Time average is less than a first threshold; and
turning off the congestion control when a ratio of the short-term Round Trip Time average to a minimum short-term Round Trip Time average exceeds a second threshold.

17. A non-transitory computer readable storage medium storing computer program code, which when executed by a processor of a computer system, causes the computer system to perform operations for controlling the transmission of data over a connection employing a congestion control system, the operations comprising:
detecting a decrease of a Round Trip Time in respect of the connection by comparing a short-term Round Trip Time average with a long-term Round Trip Time average, wherein the short-term Round Trip Time average and the long-term Round Trip Time average are calculated independently of each other using different smoothing factors; and
in response to a result of the detection, adjusting the congestion control to increase the data transmission rate, wherein the smoothing factor for calculating the long-term Round Trip average is larger than the one for the short-term Round Trip Time average.

18. An apparatus adapted to control the transmission of data over a connection employing a congestion control mechanism, the apparatus comprising:
- a detector adapted to detect a decrease of a Round Trip Time in respect of the connection by comparing a short-term Round Trip Time average with a long-term Round Trip Time average, wherein the short-term Round Trip Time average and the long-term Round Trip Time average are calculated independently of each other using different smoothing factors; and
- an adjuster adapted to, in response to a result of the detection, adjust the congestion control to increase data transmission rate, wherein the smoothing factor for calculating the long-term Round Trip average is larger than the one for the short-term Round Trip Time average.

19. The apparatus of claim 18, wherein the adjuster is further adapted to adjust the congestion control over a period of time to gradually increase the data transmission rate.

20. The apparatus of claim 19, wherein the detector is further adapted to detect an increase of the Round Trip Time in respect of the connection, and wherein the adjustor is further adapted to, in response to a result of the detection of the increase, stop adjusting the congestion control.

21. The apparatus of claim 20, wherein the detector is further adapted to compare the short-term Round Trip Time average with a minimum Round Trip Time average in order to detect the increase.

\* \* \* \* \*